Patented Oct. 31, 1933

1,933,003

UNITED STATES PATENT OFFICE 1,933,003

PROCESS OF PRODUCING KETO-DERIVATIVES OF CHOLANIC ACID

Friedrich Boedecker, Dahlem, near Berlin, Gustav Reverey, Steglitz, near Berlin, and Hans Volk, Tempelhof, near Berlin, Germany No Drawing. Application September 22, 1931, Serial No. 564,468, and in Germany April 4, 1931

10 Claims. (Cl. 260—106)

The present invention relates to the producing of keto-derivatives of cholanic acid ($C_{23}H_{39}.CO_2H$) and the process according to the invention is started with cholanic acid derivatives which except the hydroxyl groups do not contain any substituents which are oxidizable by chromic acid. Only cholanic acid derivatives which contain free hydroxyl groups can be used as starting material.

As will be known, hydroxy-cholanic acids are practically insoluble in water. The oxidation of hydroxycholanic acids into keto-cholanic acids by means of chromic acid was hitherto performed by dissolving an hydroxycholanic acid, for instance cholic acid ($C_{23}H_{36}.(OH)_3.CO_2H$), in acetic acid. The yield was however at this treatment always a poor one, and this poor yield appears to be due to a further oxidation of the reaction product taking place. Another drawback of the known process resides in the fact, that great quantities of glacial acetic acid must be used and this fluid can only be recovered by means of a complicated and expensive treatment whereby great losses arise. Also the purification of the end product is connected with difficulties because during the recrystallizing from alcohol a partial formation of ester takes place and the purification by producing salts and decomposing these salts involves a reduced yield.

It has been proposed to oxidize hydroxycholanic acids in watery solution without employing any solvent, but this treatment did not lead to the desired result. The oxidation commences only at relatively high temperatures whereby a great part of the produced ketonic acids is further oxidized, and on the other hand a substantial part of the hydroxycholanic acids is not attacked at all.

It has now been found, that very good results are obtained when the hydroxycholanic acids are exposed to aqueous chromic acid solutions or a chromic acid mixture in the form of a large surface, i. e. a surface of great area. In this case the oxidation takes place at low temperatures, usually at 30-40° C. If the reaction mixture is prevented from being heated to higher temperatures than about 40° C., this treatment makes it possible to obtain yields which practically are as high as the theoretical yield.

There are several ways of obtaining a great surface. The acids to be oxidized may for instance in powdery state be stirred up in an inert substance, not soluble in water for instance xylol. When diluted sulphuric acid is added and thereupon a small quantity of the chromate solution needed for the oxidation is admixed a typical emulsion is obtained to which the main part of the chromate solution is added by degrees. It is hereby not necessary to apply heat, but it is advantageous to initiate the oxidation by heating up to 35-40° C. and to bring the oxidation to an end at about 30° C. After the oxidation has been completed the xylol is driven off by means of steam and the product of oxidation (which is dehydrocholic acid ($C_{23}H_{33}O_3.CO_2H$) when cholic acid is oxidized) is separated from the solution and from the adhering chromium compounds, whereby an excellent yield of a practically pure acid is obtained.

The acid to be oxidized may also be finely distributed by distributing or depositing it on a solid carrier which is not attacked during the reactions. A suitable carrier for the acid is for instance kieselguhr. It is not necessary to execute the treatment in two distinct stages. The mixing of the hydroxycholanic acids with the carrier and the oxidation by means of chromic acid can be performed in a single working process. Particularly favorable results are obtained when the precipitation of the hydroxycholanic acid on the carrier is caused to take place in the presence of for instance alkali-metal bichromate. The presence of this substance appears to facilitate or increase the effect of the chromic acid which subsequently is set free. The materials serving as carriers may after the extraction of the product of oxidation be used anew.

There are also several other ways of giving the acids a large surface. Instead of suspending the acids in an inert substance the acids may for instance be dissolved in such a substance in the form of their esters. A particularly high yield is obtained when a solvent is used in which the ketocholanic acid ester formed is difficultly soluble, so that the total or substantially the total amount of ketocholanic acid ester which is formed during the oxidation is precipitated from the solution. This is for instance the case when triketocholanic acid methyl ester is produced in a xylol solution.

Ketocholanic acid esters which are produced in the manner described above can easily be purified and can thereupon be saponified without any disturbing secondary reactions taking place. This is a rather surprising fact, since the ketonic acids are very sensitive towards alkalies.

Example 1.—120 c. c. of xylol and 350 g of a 20 percent sulphuric acid are poured over 50 g of trihydroxycholanic acid. Thereupon in the course of 3-4 hours a solution of 48 g of crystallized sodium bichromate in 100 c. c. of water is added dropwise. During this treatment a temperature of 30-35° C. is maintained and the reaction fluid is thoroughly stirred. The chromate solution added is at first slowly consumed, but once the oxidation has commenced a good emulsion is formed and the further oxidation takes place at a faster rate. When the entire amount of bichromate solution has been added, the stirring is continued for 1-2 hours and a suitable amount of bisulfite liquor (38° Bé.) is added whereupon the xylol is driven off by means of steam. After cooling the fluid is sucked off and washed and the oxidation product is dissolved in a diluted soda solution in order to remove the chromium compounds. The chromium compounds are separated out by filtering and the dehydrocholic acid is precipitated from the filtrate by means of diluted mineral acids. The dehydrocholic acid, which is obtained in amorphous state, is made crystalline by being heated to 80-100° C. and is thereupon sucked off, washed and dried. Yield: 41-44 g having a melting point of 232-234° C. The product may if desired be thoroughly purified by recrystallization.

Example 2.—500 g of cholic acid are dissolved with 400 g of a soda lye of 15%. This solution is diluted with 2000 g of water and is stirred up with 400 g of diatomaceous earth, whereupon a solution of 400 g of sodium bichromate in 1500 g of water is added under continued stirring. Thereupon the cholic acid is applied to the diatomaceous earth by allowing a cooled mixture of 100 g of concentrated sulphuric acid at room temperature to slowly flow into the sodium cholate solution. The oxidation is called forth by heating the entire mass up to 40° C. under stirring and slowly adding a mixture of 1700 g of concentrated sulphuric acid and 1000 g of water. Hereby a temperature of 38-40° C. is maintained by regulating the rate of flow of the mixture and cooling. After the entire amount of sulphuric acid has been added the stirring is continued for about half an hour at 40° C. The temperature decreases after the reaction has been completed. The bichromate which has not been consumed or spent is reduced by adding sulfurous acid and the entire matter is thereupon diluted with water, whereupon the acid is filtered off and washed with water until as much as possible of the chromium has been removed. The acid is thereupon redissolved with soda in the usual manner.

The diatomaceous earth is filtered off and washed. By means of the described treatment a crude acid is produced, which has a melting point of 222-226° C. After recrystallization with acetic acid a product is obtained, which contains up to 85% of pure dehydrocholic acid of a melting point of 233-235° C.

Example 3.—600 c. c. of xylol and 1 kg of sulphuric acid of 15% are poured over 85 g of cholic acid methyl ester. In the course of 2-3 hours a solution of 80 g of sodium bichromate in about 300 c. c. of water is added (dropwise) and a temperature of 30-40° C. is maintained and the fluid is thoroughly stirred. After the fluid has cooled the crystallized dehydrocholic acid methyl ester is sucked off, washed with water and dried. The obtained crude ester (about 80 g) is thoroughly purified by recrystallization. The saponification is performed by suspending 41.6 g of the ester in 200 c. c. of alcohol, adding 28 c. c. of a watery soda lye of 15% and heating in water bath until a solution is produced and the fluid is no more rendered turbid when water is added. Thereupon 200 c. c. of water are added and the sodium salt of dehydrocholic acid is decomposed by acidifying lightly. When the fluid is allowed to cool, the acid will crystallize out in the form of small needles having a melting point of 234° C.

It will be understood, that the temperatures at which the oxidation is performed will vary somewhat in accordance with the nature of the substances under treatment and the conditions under which the treatment takes place. Usually temperatures below 40° C. are used, but in some cases, temperatures of 40° C. or more may be employed.

We claim:—

1. A process of producing keto-derivatives of cholanic acid comprising the steps of distributing finely by means of an inert medium cholanic acid derivatives which contain free hydroxyl groups and which except the hydroxyl groups do not contain any substituents which are oxidizable by chromic acid and oxidizing by means of an aqueous chromic acid solution.

2. A process of producing keto-derivatives of cholanic acid, comprising the steps of suspending by means of an inert substance which is insoluble in water, cholanic acid derivatives which contain free hydroxyl groups and which except the hydroxyl groups do not contain any substituents which are oxidizable by chromic acid and oxidizing by means of an aqueous chromic acid solution.

3. A process of producing keto-derivatives of cholanic acid, comprising the steps of suspending by means of an inert fluid substance cholanic acid derivatives which contain free hydroxyl groups and which except the hydroxyl groups do not contain any substituents which are oxidizable by chromic acid and oxidizing by means of an aqueous chromic acid solution.

4. A process of producing keto-derivatives of cholanic acid, comprising the steps of distributing an hydroxycholanic acid finely by means of an inert medium and oxidizing by means of an aqueous chromic acid solution.

5. A process of producing keto-derivatives of cholanic acid, comprising the steps of suspending an hydroxycholanic acid by means of an inert substance which is insoluble in water and oxidizing by means of an aqueous chromic acid solution.

6. A process of producing keto-derivatives of cholanic acid, comprising the steps of suspending an hydroxycholanic acid in an inert fluid substance and oxidizing by means of an aqueous chromic acid solution.

7. A process of producing keto-derivatives of cholanic acid in the form of esters, comprising the steps of dissolving an ester of an hydroxycholanic acid in an inert substance and oxidizing by means of an aqueous chromic acid solution.

8. A process of producing an ester of a ketocholanic acid, comprising the steps of distributing finely by means of an inert medium an ester of an hydroxycholanic acid and oxidizing by means of an aqueous chromic acid solution.

9. A process of producing an ester of a keto-cholanic acid, comprising the steps of suspending an ester of an hydroxycholanic acid by means of an inert substance which is insoluble in water and oxidizing by means of an aqueous chromic acid solution.

10. A process of producing an ester of a keto-cholanic acid, comprising the steps of suspending an ester of an hydroxycholanic acid in an inert fluid substance and oxidizing by means of an aqueous chromic acid solution.

FRIEDRICH BOEDECKER.
GUSTAV REVEREY.
HANS VOLK.